March 16, 1971 C. E. MUCKELRATH 3,570,049

SMALL GAME SKINNING BOARD

Filed June 16, 1969

INVENTOR
CLYDE E. MUCKELRATH

BY

ATTORNEYS

United States Patent Office 3,570,049
Patented Mar. 16, 1971

3,570,049
SMALL GAME SKINNING BOARD
Clyde E. Muckelrath, Rte. 2, Box 178,
Newellton, La. 71357
Filed June 16, 1969, Ser. No. 833,351
Int. Cl. A22c 15/00
U.S. Cl. 17—44.2
8 Claims

ABSTRACT OF THE DISCLOSURE

The skinning board for animals includes a panel having a neck-receiving slot extending downwardly from its upper edge adjacent one side, and also a pair of spaced feet-receiving slots extending downwardly from its upper edge adjacent the other side. A metallic plate is disposed behind the pair of spaced slots and has serrated side edges disposed substantialy opposite the outer walls of the pair of slots which are adapted to impale the feet of the animal engaged in said pair, the plate being upwardly and rearwardly inclined with respect to the pair of slots. Means are provided for mounting the panel on a wall or other support with its rear face spaced therefrom.

---

This invention is a novel game skinning board particularly adapted for skinning the fur off fur-bearing animals of various kinds.

The principal object of the invention is to provide a board having in its upper edge, at one side, a slot which contracts towards the lower end adapted to receive the neck portion of the animal immediately behind the head, to suspend the animal across the outer face of the board in position for skinning. The board also has in its upper edge, at the other side thereof, a pair of spaced parallel slots adapted to receive the feet, such as the hind feet, of the animal to be skinned to suspend the animal across the surface of the board in position for skinning, the two slots being backed by a strip of metal having serrated edges disposed adjacent the outer edges of the pair of slots respectively, the metal strip being inclined upwardly and rearwardly with respect to the board and adapted to receive the feet of the animal, whereby a downward pull on the animal will cause the feet to bind more securely therein impaled on said serrations, the serrated edges of the backing plate engaging the feet of the animal opposite the outer edges of the pair of slots, and the space between the back of the board and the serrated edges decreasing progressively from the upper edge of the plate to the bottom of the pair of slots.

I will explain the invention with reference to the accompanying drawing which illustrates one practical embodiment thereof, to enable others familiar with the art to adopt and use the same; and will summarize in the claims the novel features of construction and novel combinations of parts, for which protection is desired.

My novel skinning board preferably comprises a panel 1 preferably rectangular and formed of plywood, although the same may be formed of any other desired material, the same being of size to suit the animal to be skinned. In the upper edge of the panel 1 adjacent one side thereof, is a downwardly extending slot 2 which is preferably substantially semi-circular at its top as at 2a, the slot narrowing about its mid height and the sides converging as at 2b adjacent the lower end thereof, the converging portions 2b being adapted to receive therebetween the neck of the animal A to be skinned immediately behind the head of the animal, as shown more particularly in FIG. 5, to suspend the animal in workable position across the outer face of the panel 1.

Figure 3:
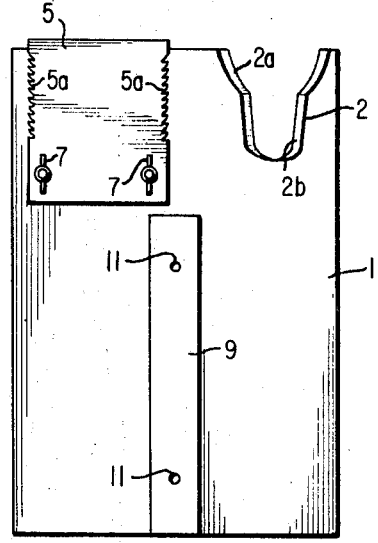
FIG. 3 is a rear elevation thereof.
Figure 6:
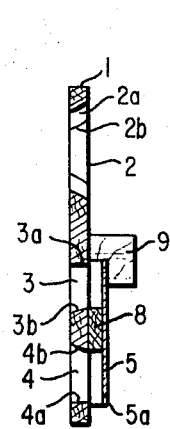
FIG. 6 is a horizontal section on the line 6—6, FIG. 2.
Figure 5:
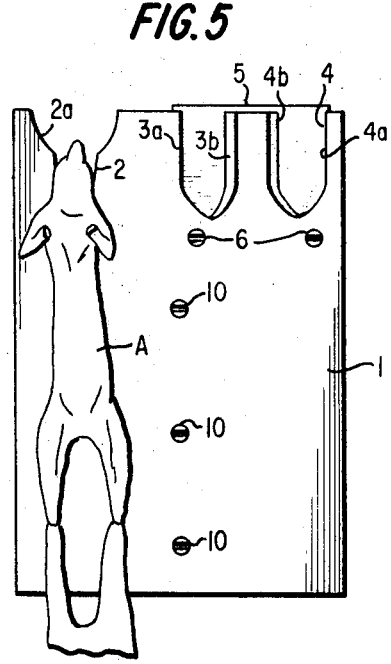
FIG. 5 is a view similar to FIG. 1 but showing the animal suspended by its neck immediately behind the head, and showing the animal substantially completely skinned.

As shown more particularly in FIGS. 3, 5 and 6, the side edges of the portions 2a, 2b of the slot 2 are beveled rearwardly and outwardly so as to facilitate the entry of the neck portion of the animal A into the slot 2 and to allow for variations in neck sizes of the animals to be skinned, so that the slot 2 will support the animal in skinning position by the neck as shown in FIG. 5.

In the top of the panel 1 adjacent the opposite side from the slot 2 are a pair of spaced parallel slots 3 and 4, respectively, the same being of substantially the same depth as the slot 2 but being of substantial U-shape, the slots 3, 4, narrowing adjacent the lower portions thereof.

Figure 4:
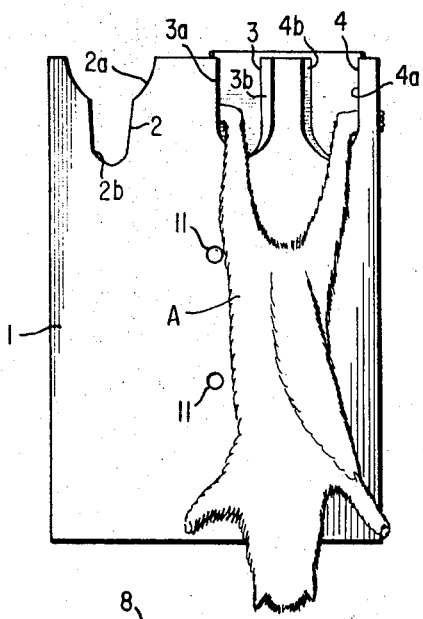
FIG. 4 is a front elevational view similar to FIG. 1 showing an animal suspended by its hind feet which engage the pair of parallel spaced slots in the upper edge of the board.

As shown more particularly in FIG. 6 the outer edges 3a, 4a of each of the slots 3 and 4, is preferably normal to the face of the panel 1, while the inner walls 3b, 4b, respectively, are flared rearwardly and outwardly to facilitate entry of the feet of the animal A into the slots 3 and 4, as shown in FIG. 4, the feet of the animal A when inserted in the slots 3, 4 being turned outwardly to extend past the outer edges 3a, 4a of the slots 3 and 4, respectively.

In order to secure the feet of the animal A in the slots 3, 4, I provide a metallic plate 5 behind the slots 3 and 4, the plate being secured adjacent its lower end to the panel 1 by means of bolts 6 extending through holes in the panel 1 and through registering holes in the lower portion of the plate 5, said bolts carrying thumb nuts 7 thereon to securely lock the bottom edge of the plate 5 to the back of the panel. The side edges of the plate 5 slightly overlap the outer edges 3a, 4a of the slots 3 and 4, and the outer edges are sharply serrated as at 5a, FIG. 3, so that the feet of the animal A suspended by its legs in the slots 3, 4 will be impaled on the sharp serrations 5a to hold the feet in the slots, whereby a downward pull on the animal will cause the serrations to dig more firmly into the feet and thus firmly support the animal across the panel 1 in the position shown in FIG. 4, in which position the animal is prepared for the skinning operation.

Figure 1:
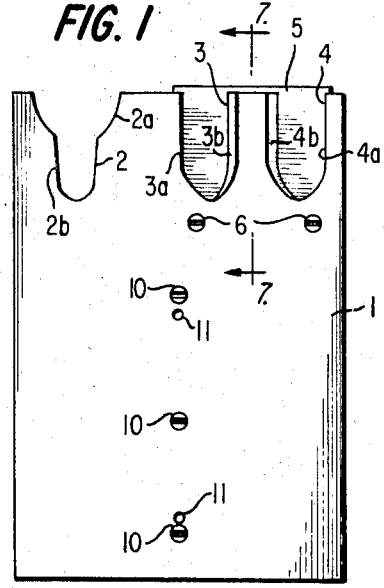
FIG. 1 is a front elevational view of my novel skinning board.
Figure 2:
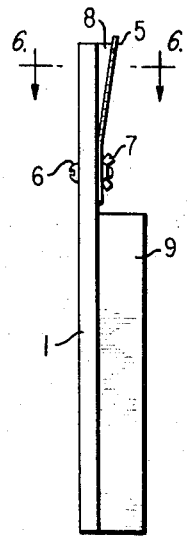
FIG. 2 is a side elevation thereof.
Figure 7:
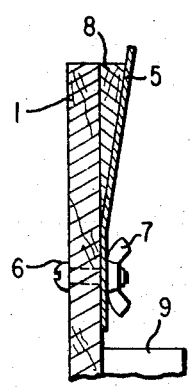
FIG. 7 is an enlarged vertical section on the line 7—7, FIG. 1.

The plate 5 as shown in FIGS. 2 and 7 is bent slightly so that the plate is farther away from the board at the upper edge of the panel 1 than from the lower portion thereof adjacent the bolts 6. To maintain the plate 5 in such angularity I provide a wedge 8, FIGS. 2, 6 and 7, disposed between the back of the panel 1 intermediate the slots 3 and 4 and the rear face of the plate 5, which wedge 8 may be secured in place in any desired manner.

In order to support the panel 1 in front of a wall or other support upon which the panel is to be mounted, I provide a vertically disposed block 9, preferably of wood, which is secured to the lower portion of the back of the panel 1 by means of screws 10, the block 9 being disposed on the approximate vertical axis of the panel 1 but terminating somewhat below the level of the plate 5. Through the panel 1 and the block 9 extend upper and lower bores 11 to receive nails or the like for ready attachment of the panel 1 to a wall or other support with the panel disposed in front of the wall so as to not interfere with the insertion of the neck or feet of the animal A to be skinned into their respective slots 2, 3 or 4.

I claim:
1. A skinning board for animals comprising a panel having a pair of spaced feet-receiving slots extending downwardly therein from its upper edge; a plate on the back of the panel disposed behind the pair of spaced slots having serrated side edges disposed substantially opposite the outer walls of the pair of slots and adapted to impale the feet of the animal engaged in said pair of slots; said plate being upwardly and rearwardly inclined with respect to the said pair of slots.

2. In a board as set forth in claim 1, said plate being removably secured adjacent its lower end to said panel; and a wedge interposed between the panel and plate disposed between the said pair of slots to maintain the plate in inclined relation thereto, whereby a downward pull on the animal will cause the feet to be more tightly impaled on the serrations.

3. In a board as set forth in claim 1, the walls of the feet-receiving slots remote from the serrated edges being outwardly and rearwardly flaring.

4. A skinning board for small animals comprising a substantially rectangular panel having a neck-receiving slot extending downwardly therein from its upper edge adjacent one side, and having a pair of spaced feet-receiving slots extending downwardly therein from its upper edge; a plate on the back of the panel disposed behind the pair of spaced slots having serrated side edges disposed substantially opposite the outer walls of the pair of slots and adapted to impale the feet of the animal engaged in said slots; the said plate being upwardly and rearwardly inclined with respect to the said pair of slots; and means for mounting the panel on a support in spaced relation thereto.

5. In a board as set forth in claim 4, said plate being removably secured adjacent its lower end to said panel; and a wedge interposed between the panel and plate disposed between the said pair of slots to maintain the plate in inclined relation thereto, whereby a downward pull on the animal will cause the feet to be more tightly impaled on the serrations.

6. In a board as set forth in claim 4, said walls of the neck-receiving slot being outwardly and rearwardly flaring.

7. In a board as set forth in claim 4, the walls of the feet-receiving slots remote from the serrated edges being outwardly and rearwardly flaring.

8. In a board as set forth in claim 4, said mounting means comprising a vertical block secured to the back of the panel along the axis thereof, said block having spaced holes registering with holes through the panel to receiving fastening nails, and said block terminating below said plate.

References Cited
UNITED STATES PATENTS

| | | | |
|---|---|---|---|
| 2,830,840 | 4/1958 | Johnson | 294—79 |
| 2,887,233 | 5/1959 | Bybee | 248—224X |
| 2,981,972 | 5/1961 | Zebarth | 17—44.1 |
| 3,137,030 | 6/1964 | Varner | 17—44.2 |

LUCIE H. LAUDENSLAGER, Primary Examiner

U.S. Cl. X.R.
248—224; 294—79